United States Patent [19]

Alm

[11] Patent Number: 4,480,643

[45] Date of Patent: Nov. 6, 1984

[54] SIEVE PLATE BAFFLE ATTACHMENT FOR GRAIN COMBINES

[75] Inventor: Arthur L. Alm, Griswold, Iowa

[73] Assignee: Murry W. Schuler, Griswold, Iowa; a part interest

[21] Appl. No.: 398,072

[22] Filed: Jul. 14, 1982

[51] Int. Cl.³ .................................... A01F 12/32
[52] U.S. Cl. ........................... 130/24; 130/27 Z; 130/DIG. 6
[58] Field of Search ............ 130/27 R, 24, 27 Z, 130/DIG. 6, 27 H, 27 HF, 27 T; 56/14.6

[56] References Cited

U.S. PATENT DOCUMENTS

| | | | |
|---|---|---|---|
| 1,230,437 | 6/1917 | Schuette | 130/24 |
| 2,318,661 | 5/1943 | Beckmann | 130/27 Z |
| 2,670,845 | 3/1954 | Busack et al. | 130/27 Z |
| 2,950,720 | 8/1960 | Sheard | 130/24 |
| 3,367,496 | 2/1968 | Cockle et al. | 130/24 |
| 3,603,063 | 9/1971 | Stroburg | 130/27 HF |
| 3,610,252 | 10/1971 | DeCoene | 130/24 |
| 4,250,897 | 2/1981 | Glaser | 130/27 T |

FOREIGN PATENT DOCUMENTS 1411314  6/1975  United Kingdom .............. 130/24

*Primary Examiner*—Robert P. Swiatek
*Assistant Examiner*—David I. Tarnoff
*Attorney, Agent, or Firm*—Zarley, McKee, Thomte, Voorhees & Sease

[57] ABSTRACT

A conventional grain harvesting combine is disclosed herein comprising a wheel supported body, a grain harvesting means on the forward end thereof, at least two parallel substantially horizontal spaced perforated sieve plates adjacent the rearward end thereof, and a fan means adapted to direct air upwardly and rearwardly through the sieve plates to remove chaff from harvested grain thereon. The improvement to this conventional structure as disclosed herein comprises an end gate on the combine which acts in conjunction with at least two baffle members which extend laterally across the body member adjacent the rearward ends of the sieve plates to substantially reduce the amount of air flowing upwardly and rearwardly through the rearward end of the uppermost sieve plate. The baffle members can be either of solid or perforated construction or a combination thereof.

The rearward end of the upper sieve plate has a replaceable portion of perforated construction so that it can be readily replaced to accommodate the specific type of grain being harvested.

9 Claims, 5 Drawing Figures

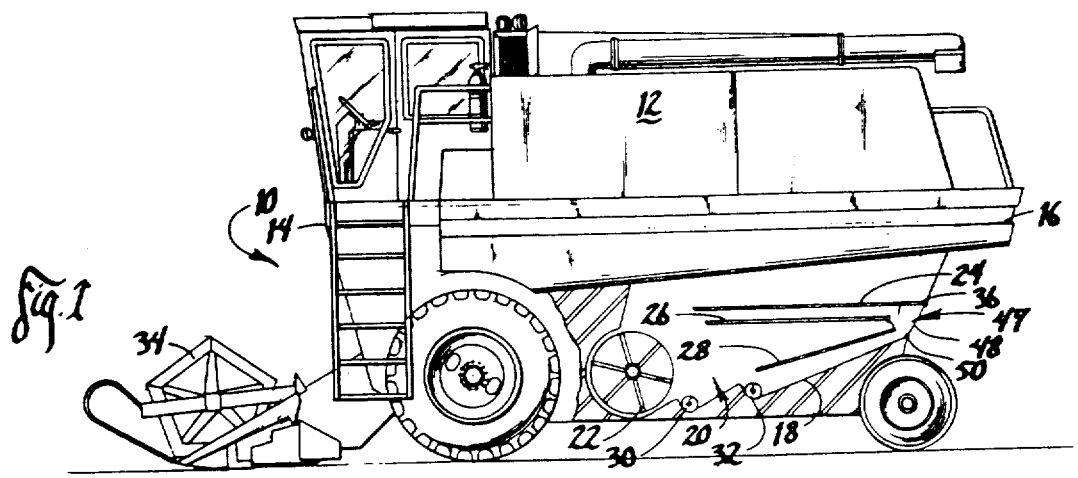
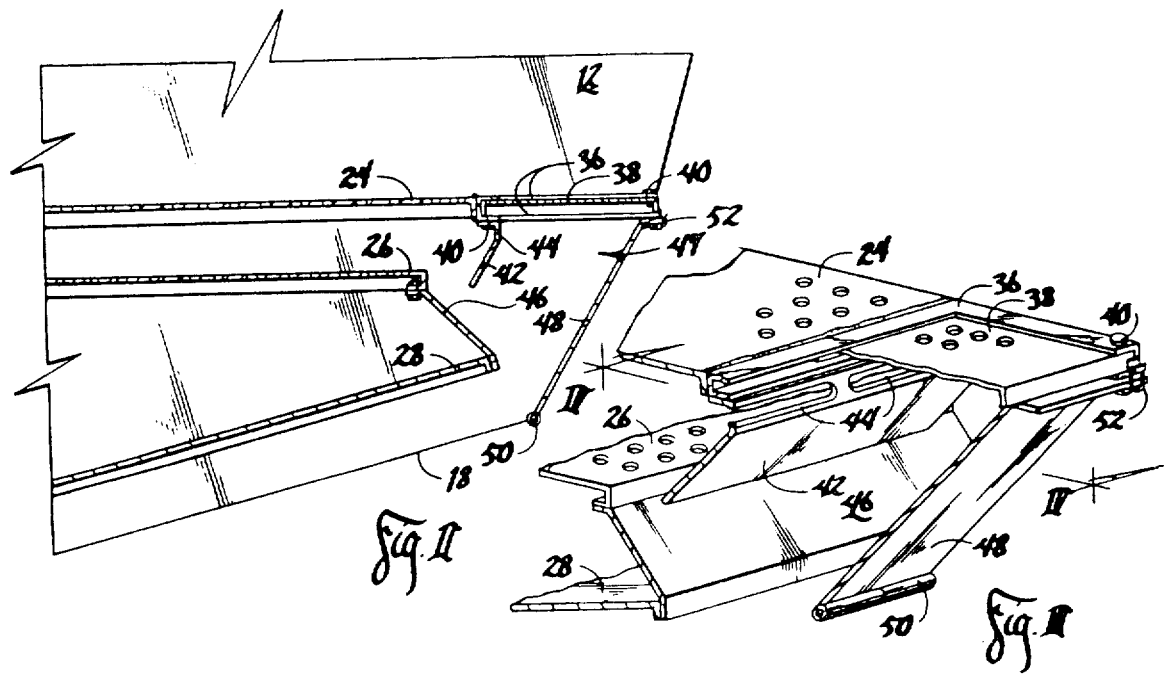
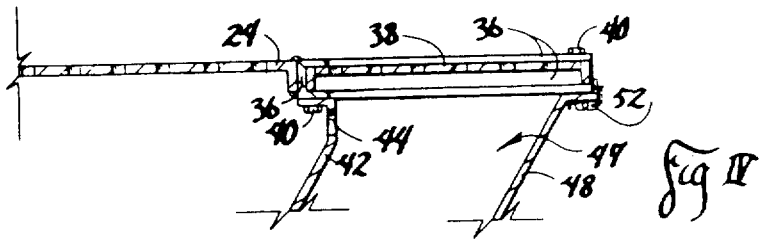
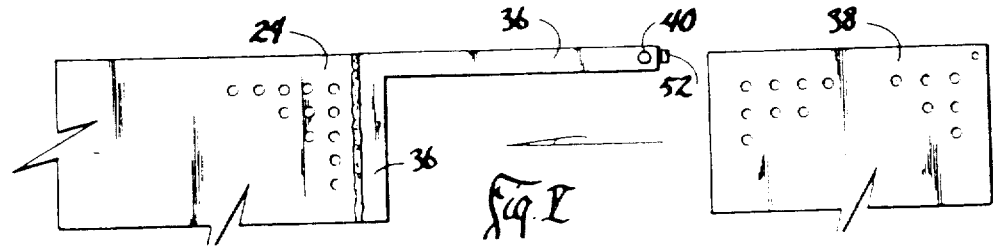

SIEVE PLATE BAFFLE ATTACHMENT FOR GRAIN COMBINES

BACKGROUND OF THE INVENTION

All modern combines include at least a pair of substantially horizontal perforated sieve plates. The harvested grain is deposited on the upper sieve plate, and a fan directs air upwardly and rearwardly through this plate to blow away the chaff and foreign material and to permit the clean grain to fall through the perforations of the plate. Normally, a second sieve plate is located below and in spaced relation to the first sieve plate where the same action is repeated.

The problem created by the sieve plates of the modern combines is that depending upon the speed of the combine and the harvesting conditions, some harvested grain accumulates on the rearward end of the upper sieve plate and falls out of the combine and onto the ground because of the high velocity draft of the combine fan. This condition can be reduced by slowing the speed of the combine, but this obviously reduces the efficiency of the harvesting operation. For example, conventional combines harvesting wheat can lose up to two bushels per acre off of the rearward end of the upper sieve plate while harvesting at a speed of around four miles per hour. This loss of grain can be reduced, but not eliminated, by slowing the speed of the combine down to around three miles per hour.

It is therefore a principal object of this invention to provide a sieve plate baffle attachment for grain combines which will substantially eliminate the loss of harvested grain from the rearward end of the upper sieve plate.

It is a further object of this invention to provide a sieve plate baffle attachment for grain combines which will permit the combine to function at maximum ground speed without losing grain from the rearward end of the upper sieve plate.

A further object of this invention is to provide a sieve plate baffle attachment for grain combines which is readily adaptable to combines of all designs.

A still further object of this invention is to provide a sieve plate baffle attachment for grain combines which is easily manufactured, durable in use, and easily operated.

These and other objects will be apparent to those skilled in the art.

BRIEF SUMMARY OF THE INVENTION

A sieve plate baffle attachment for grain combines is disclosed and is comprised of an end gate which closes the rearward portion of the combine below the conventional upper sieve plate. One or more baffle elements extend laterally across the rearward end of the combine adjacent the rearward ends of the sieve plates to reduce the flow of air upwardly and rearwardly through the rearward end of the upper sieve plate. The rearward end portion of the upper sieve plate is removable to permit different portions to be inserted which are particularly adapted to the specific grain being harvested.

BRIEF DESCRIPTION OF THE DRAWINGS

FIG. 1 is a partial sectional view of a combine showing my new invention;

FIG. 2 is an enlarged scale sectional view showing in more detail a portion of the structure of FIG. 1;

FIG. 3 is a partial perspective view of the structure of FIG. 2;

FIG. 4 is an enlarged scale sectional view taken on line 4—4 of FIG. 3; and

FIG. 5 is a partial exploded plan view of the structure of FIG. 4.

DESCRIPTION OF THE PREFERRED EMBODIMENT

A combine 10 is comprised of a wheel mounted body 12 having a forward end 14 and a rearward end 16. The numeral 18 designates generally the bottom portion of the combine. A conventional cleaning compartment 20 housing fan 22, upper sieve plate 24 and lower sieve plate 26, and clean grain plate 28 is best shown in FIG. 1. The upper and lower sieve plates are perforated and are adapted to have grain fall therethrough in conventional fashion. A conventional clean grain auger 30 is shown in FIG. 1 and a return auger 32 is adapted to conventionally return unclean grain back through the system for the cleaning process.

The combine 10 is shown in FIG. 1 to have a conventional grain table 34 mounted on the forward end thereof for cutting the grain and causing it to pass rearwardly through the combine.

The structure described heretofore is conventional for most modern combines, and does not, per se, comprise the instant invention.

The modifications to the above-described conventional structure will now be described in detail. A three-sided frame 36 comprised of channels or the like is welded or otherwise secured to the rearward end of the upper sieve plate 24. A perforated channel plate 38 is adapted to be received through the rearward edge of the frame 36, and is held within frame 36 by set screws 40.

An upper baffle 42 is secured to the forward edge of frame 36 by any convenient means such as a bolt or the like. Preferably, baffle 42 extends downwardly and forwardly as best shown in FIGS. 2, 3 and 4. Horizontal slots 44 are positioned along the upper portion of baffle 42.

A lower baffle 46 is secured in any convenient fashion, such as bolts or the like, to the ends of lower sieve plate 26 and plate 28 as best seen in FIG. 2. Baffle 46 is of solid construction and substantially closes the space between the rearward ends of the sieve plate 26 and the plate 28 to prevent the passage of air therebetween.

It should be noted that the baffle 42 does not completely close the space between the two sieve plates 24 and 26. The purpose of baffle 46 is to force all of the air from the fan upwardly through the lower sieve plate 26. The function of the baffle 42 is to reduce the amount of air flowing upwardly and rearwardly through the perforated channel 38 so that the zone designated by the numeral 47 (FIG. 2) has a reduced quantity of upwardly flowing air. Thus, the quantity and velocity of the air moving upwardly through the perforated channel 38 is less than that flowing through the upper sieve plate 24.

A solid gate 48 is hinged by hinge 50 to the bottom portion 18 as shown in FIG. 2. Gate 48 effectively closes the rearward end of the combine between the rearward end of perforated channel 38 and the rearward end of the lower portion 18. Gate 48 cooperates with baffles 42 and 46 to cause the air passing under and through baffle 42 to move upwardly through the perforated channel 38.

The foregoing structure substantially reduces the flow of air upwardly through the perforated channel 38 compared to the flow of air through the upper sieve plate 24 forwardly of baffle 42. As a result, any accumulation of harvested grain on the top of perforated channel 38 will have an opportunity to fall downwardly through the perforations thereon and will not be swept rearwardly to the ground by a high velocity flow of air. Some air will nevertheless move upwardly through plate 38, and this will permit some chaff to be removed from any harvested grain thereon.

While the grain moving downwardly through perforated channel 38 will not be of an absolutely clean quality, it will move downwardly and forwardly over bottom portion 18 to return auger 32 where it will be processed back through the machine for another cleaning cycle.

It has been determined that the device and method of this invention will substantially eliminate the loss of grain from the rearward end of the upper sieve plate which will increase the yield of certain grains up to two bushels per acre. Perhaps even more importantly, the device and method of this invention will permit a 25% to 30% increase in the speed of the combine without any grain lossage. For example, where conventional combines may be required to operate at a speed of three to four miles per hour under certain harvesting conditions, the same combine can harvest at four to five miles per hour with the structure of this invention.

From the foregoing, it is seen that this invention will achieve at least all of its stated objectives.

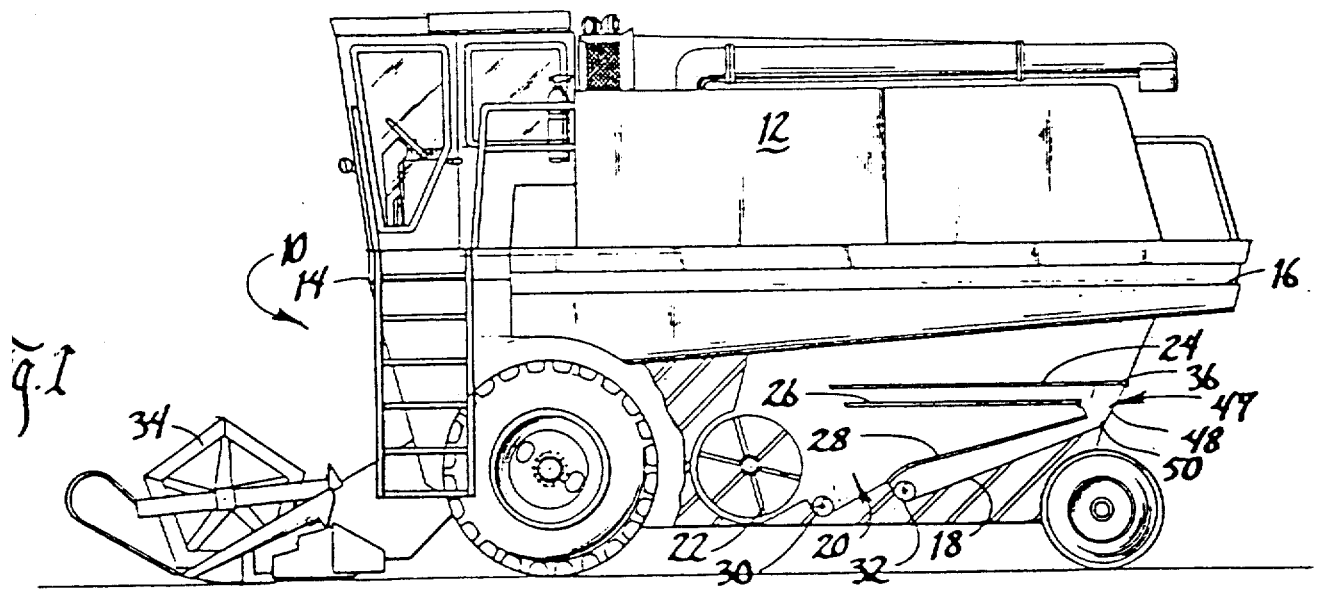

I claim:

1. A grain harvesting machine, comprising,
   a wheel supported body with a bottom portion and forward and rearward ends, and a grain harvesting means on the forward end thereof,
   at least two parallel substantially horizontal spaced perforated upper and lower sieve plates adjacent the rearward end of said body above said bottom portion,
   a grain plate positioned in spaced relationship between said lower sieve plate and said bottom portion,
   said upper and lower sieve plates having rearward ends with the rearward end of said upper sieve plate extending rearwardly beyond the rearward end of said lower sieve plate,
   fan means on said body adapted to direct air upwardly and rearwardly through said sieve plates to remove chaff from harvested grain on said sieve plates,
   a first baffle means connecting the rearward ends of said grain plate and said lower sieve plate to prevent air from said fan from moving rearwardly from between the rearward ends thereof, and to cause air from said fan in between said grain plate and said lower sieve plate to move upwardly through said lower sieve plate towards said upper sieve plate,
   a second baffle means secured to and extending downwardly from said upper sieve plate at a position rearwardly of the rearward end of lower sieve plate and forwardly of the rearward end of said upper sieve plate, said second baffle means extending downwardly below the level of the rearward end of said lower sieve plate to cause substantially the air moving upwardly through said lower sieve plate to move upwardly through said upper sieve plate forwardly of said second baffle means so as to minimize the upper movement of air through the rearward end of said upper sieve plate.

2. The device of claim 1 wherein a gate means is secured to said body member to substantially close the space between the rearward end of said bottom portion and the rearward end of said uppermost sieve plate.

3. The device of claim 1 wherein a space exists below said second baffle means for permitting a restricted amount of air to pass thereunder for upper movement through the rearward end of said upper sieve plate.

4. The device of claim 1 wherein said second baffle means extends downwardly and forwardly from said upper sieve plate.

5. The device of claim 1 wherein said body includes a return auger means for moving a portion of said harvested grain from said sieve plates for depositing the same a second time on the upper sieve plate, with the rearward end of said upper sieve plate being in direct communication with said return auger means so that all of the harvested grain moving downwardly through the rearward end of said upper sieve plate will be recycled through said return auger.

6. A method of harvesting grain comprising:
   cutting and combining grain and chaff and depositing said grain and chaff on a perforated upper sieve plate having a lower sieve plate spaced therebelow and a grain plate spaced below said lower sieve plate, the space between said upper and lower sieve plates defining a first air path, the spaces between said lower sieve plate and said grain plate defining a second air path, said upper sieve plate having forward and rearward portions,
   blowing a quantity of air upwardly and rearwardly through said first and second air paths so that air will pass upwardly and rearwardly through said forward portion of said uppr sieve plate;
   blocking the rearward movement of air from between the rearward ends of said grain plate and said lower sieve plate to force rearwardly moving air in said second air path upwardly through said lower sieve plate thereby preventing air moving between said lower sieve and said grain plate from passing directly through said upper sieve,
   extending said upper sieve plate rearwardly of the rearward end of said lower sieve plate,
   at least partially blocking and dividing the rearward movement of air in said first air path at a point rearwardly of said lower sieve plate to force a substantial portion of such air through said upper sieve plate forwardly of the rearward end thereof and to permit only a restricted amount of air from flowing through said upper sieve plate adjacent the rearward end thereof and rearwardly of the position where the rearward movement of air in said first air path is partially blocked and divided thereby decreasing the upward movement of air through said rearward end of said upper sieve.

7. The method of claim 6 wherein said blocking and dividing of air in said first air path is accomplished by extending a first baffle plate transversely downwardly from said first sieve plate so that the substantial portion of such air moves upwardly and forwardly of said baffle plate towards said first sieve plate, and said restricted amount of said air moves underneath said first baffle plate.

8. The method of claim 6 comprising the further step of closing the space rearwardly of said grain plate and said sieve plates to force all of the air moving rearwardly in said first and second paths to move upwardly through said first sieve plate in the manner described.

9. The method of claim 6 wherein all of the grain falling downwardly through the perforations of the rearward portion of said sieve plate will be moved and redeposited a second time on the top of said upper sieve plate.

* * * * *

UNITED STATES PATENT AND TRADEMARK OFFICE
CERTIFICATE OF CORRECTION

PATENT NO.    : 4,480,643
DATED         : November 6, 1984
INVENTOR(S)   : Arthur L. Alm It is certified that error appears in the above-identified patent and that said Letters Patent is hereby corrected as shown below:

Figure 1, should appear as shown on the attached sheet.

Signed and Sealed this

Fourth Day of June 1985

[SEAL]

Attest:

DONALD J. QUIGG

Attesting Officer     Acting Commissioner of Patents and Trademarks